US011010820B2

United States Patent
Lampert et al.

(10) Patent No.: US 11,010,820 B2
(45) Date of Patent: May 18, 2021

(54) REQUEST FULFILLMENT SYSTEM, METHOD, AND MEDIA

(71) Applicant: TRANSFORM SR BRANDS LLC, Hoffman Estates, IL (US)

(72) Inventors: Edward Lampert, Greenwich, CT (US); Eui Chung, Huntley, IL (US); Bharath Sridharan, Glendale Heights, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 554 days.

(21) Appl. No.: 15/147,537

(22) Filed: May 5, 2016

(65) Prior Publication Data

US 2017/0323371 A1    Nov. 9, 2017

(51) Int. Cl.
*G06Q 30/00* (2012.01)
*G06Q 30/06* (2012.01)
*G06Q 10/08* (2012.01)

(52) U.S. Cl.
CPC ..... *G06Q 30/0641* (2013.01); *G06Q 10/0833* (2013.01); *G06Q 30/0601* (2013.01); *G06Q 30/0623* (2013.01); *G06Q 30/0635* (2013.01)

(58) Field of Classification Search
CPC ........... G06Q 10/0833; G06Q 30/0601; G06Q 30/0623; G06Q 30/0641; G06Q 30/0635
See application file for complete search history.

(56) References Cited

U.S. PATENT DOCUMENTS

| | | | | |
|---|---|---|---|---|
| 6,078,886 | A  * | 6/2000 | Dragosh | G10L 15/30 704/243 |
| 7,024,363 | B1 * | 4/2006 | Comerford | G10L 15/22 704/270 |
| 9,047,631 | B2 | 6/2015 | Sridharan et al. | |
| 9,318,108 | B2 * | 4/2016 | Gruber | G10L 15/22 |
| 9,575,563 | B1 * | 2/2017 | Li | G06F 3/03547 |
| 9,626,703 | B2 * | 4/2017 | Kennewick, Sr. | G10L 15/1815 |
| 9,875,471 | B1 * | 1/2018 | Myrick | G06Q 10/06314 |

(Continued)

OTHER PUBLICATIONS

"Location Aware Question Answering based Product Searching in Mobile Handheld Devices," by SK Alamgir Hossain, A.S.M. Mahfujur Rahman, Thomas T. Tran, and Abdulmotaleb El Saddik, Proceedings— IEEE International Symposium on Distributed Simulation and Real-Time Applications, DS-RT: 189-195, (Year: 2010).*

(Continued)

*Primary Examiner* — Anne M Georgalas
(74) *Attorney, Agent, or Firm* — McAndrews, Held & Malloy, Ltd.

(57) ABSTRACT

Systems, methods, and apparatus are disclosed for generating and processing natural language requests. A request processing system processes a received natural language request to identify an intent of the natural language request and a confidence level of the identified intent. In response to the confidence level of the identified intent not satisfying a threshold level, the request processing system sends the natural language request to the fulfillment computing device for further processing by a person associated with the fulfillment computing device. In response to the confidence level satisfying the threshold level, the request processing system proceeds with fulfilling the request per the identified intent.

18 Claims, 6 Drawing Sheets

(56) References Cited

U.S. PATENT DOCUMENTS

| | | | | |
|---|---|---|---|---|
| 9,875,494 | B2* | 1/2018 | Kains | G10L 15/30 |
| 10,127,906 | B1* | 11/2018 | Mutagi | G10L 15/22 |
| 10,249,296 | B1* | 4/2019 | Mutagi | G10L 15/1822 |
| 10,297,249 | B2* | 5/2019 | Baldwin | G10L 25/51 |
| 10,482,505 | B2* | 11/2019 | Adoni | G06Q 30/0613 |
| 10,614,799 | B2* | 4/2020 | Kennewick, Jr. | G10L 15/18 |
| 2008/0240395 | A1* | 10/2008 | Poi | H04M 3/493 |
| | | | | 379/211.02 |
| 2013/0311324 | A1* | 11/2013 | Stoll | H04L 67/306 |
| | | | | 705/26.7 |
| 2014/0278343 | A1* | 9/2014 | Tran | G06F 17/2785 |
| | | | | 704/2 |
| 2014/0279276 | A1* | 9/2014 | Tolcher | G06Q 20/3255 |
| | | | | 705/26.81 |
| 2015/0134449 | A1* | 5/2015 | Gorelov | G06Q 30/0255 |
| | | | | 705/14.53 |
| 2016/0285816 | A1* | 9/2016 | Schmid | H04L 67/306 |

OTHER PUBLICATIONS

[Item U Continued] Institute of Electrical and Electronics Engineers Inc. (Dec. 28, 2010) (Year: 2010).*

"Amazon Dash Button, Official Site, $4.99 Credit After First Press", www.amazon.com, dated Aug. 1, 2016, 9 pages.

"Amazon Echo—Amazon Official Site—Alexa-Enabled", www.amazon.com, dated Aug. 1, 2016, 10 pages.

"HTTP Services 1.0 Programmer's Guide", Nuance Cloud Services, dated Dec. 4, 2013, 18 pages.

"Mix.nlu", Nuance Communications, Inc., dated Aug. 1, 2016, 7 pages.

"TPA2080D1 Audio Power Amplifier Evaluation Module", Texas Instruments SLOU324—Feb. 2012, 18 pages.

"CC3200 SimpleLink Wi-Fi and Internet-of-Things Solution, a Single Chip Wireless MCU", Texas Instruments Technical Reference Manual, SWRU367C, Jun. 2014—revised Mar. 2016, 522 pages.

"TLV320AIC3100 Low-Power Audio Codec With Audio Processing and Mono Class-D Amplifier", Texas Instruments, SLAS667B—Nov. 2009—revised Mar. 2016, 133 pages.

* cited by examiner

REQUEST FULFILLMENT SYSTEM, METHOD, AND MEDIA

FIELD OF THE DISCLOSURE

The present disclosure generally relates to fulfilling requests for goods and/or services.

BACKGROUND

Customers commonly purchase goods and services from brick-and-mortar stores such as retail stores, grocery stores, consumer electronic boutiques, etc. Customers also purchase goods and services via on-line vendors who provide virtual storefronts from which customers may purchase the goods and services without visiting a brick-and-mortar store. In particular, a customer using a computing device such as a laptop computer, smart phone, or tablet may visit a virtual storefront in order to select and purchase goods, services, or both from the on-line vendor.

Many customers find purchasing goods and services from an on-line vendor more convenient than physically visiting a brick-and-mortar store to make such purchases. However, purchasing from an on-line vendor generally requires the customer to undertake a many step process. For example, a customer may need to open an appropriate application such as a web browser, direct the application to the virtual store, find and select the goods and services that the customer wants to purchase, and finalize the purchase via a checkout process. The checkout process may likewise include many steps. For example, the customer may need to provide payment information, provide identification information to validate the payment information, select from several options for shipping the purchased goods, and provide an address to which the purchased goods are to be delivered or at which the services are to be performed. Each of these steps provides an additional obstacle for the customer to overcome in order to obtain the desired goods, services, or both. Moreover, each of these steps provides the customer an opportunity to reconsider and abandon the purchase.

BRIEF SUMMARY OF THE DISCLOSURE

Shown in and/or described in connection with at least one of the figures, and set forth more completely in the claims are systems, methods, and computer readable medium directed to the fulfillment of requests for goods, services, or both.

These and other advantages, aspects and novel features of the present disclosure, as well as details of illustrated embodiments thereof, will be more fully understood from the following description and drawings.

DETAILED DESCRIPTION

In some embodiments, a request fulfillment system is capable of fulfilling requests received from customers. The request fulfillment system may analyze a received request to identify an intent of the request and determine a confidence level for the identified intent. If the confidence level is sufficient, the request fulfillment system may proceed with fulfilling the request per the identified intent. However, if the confidence level is insufficient, the request fulfillment system may forward the request to an employee, who may further analyze the request and may contact the customer in order to confirm the intent of the request. In response to confirming the intent, the employee may fulfill the request or forward the request to a fulfillment system for further processing.

Figure 1:
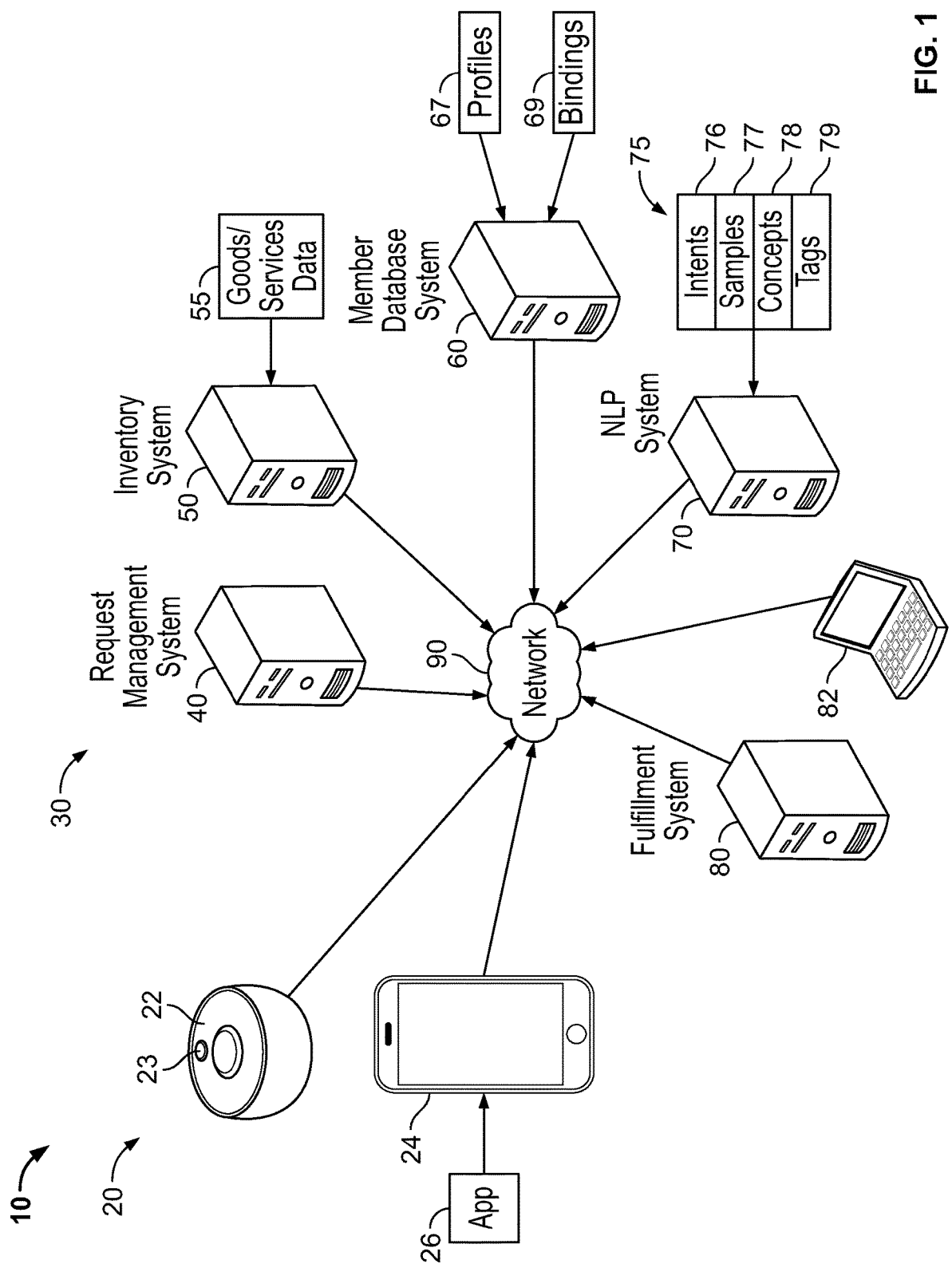
FIG. 1 shows an example request processing system in accordance with an example embodiment of the present disclosure.

Referring now to FIG. 1, an embodiment of a request fulfillment system 10 is shown. In general, the request fulfillment system 10 may analyze requests received from customers, determine an intent of such requests, and fulfill such requests per the identified intent. To this end, the request fulfillment system 10 may include one more client computing devices 20 and a request processing system 30 that are operatively coupled together via a network 90.

The network 90 may include a number of private and/or public networks that collectively provide one or more communication paths between the client computing devices 20 and the request processing system 30. For example, the network 90 may include wireless and/or wired networks, LAN (local area network) networks, WAN (wide area network) networks, PAN (personal area network) networks, cellular networks, and/or the Internet.

As shown, the client computing devices 20 may include special-purpose fulfillment devices 22 as well as general-purpose computing devices 24. Each fulfillment device 22 may be implemented as a low cost, electronic device specifically designed to receive requests from a customer and forward such requests to a request processing system 30 for processing. As such, a customer may own several fulfillment devices 22 and place such fulfillment devices 22 at multiple locations throughout their residence to increase the likelihood that a fulfillment device 22 is nearby when the customer has a request they wish to have fulfilled. Via the fulfillment device 22, the customer may send natural language, spoken requests to the request processing system 30. In some embodiments, a fulfillment device 22 may be voice-activated and the customer may merely speak their request in the vicinity of the fulfillment device 22 to initiate a request. In response to the spoken request, the fulfillment device 22 may record the audio of the spoken request to obtain a digital representation of the spoken request, generate an audio request which includes the digital representation, and forward the audio request to the request processing system 30 for processing.

In other embodiments, a fulfillment device 22 may not be voice-activated. In such embodiments, the customer may press a button 23 on the fulfillment device 22 to initiate a request. After pressing the button 23, the customer may speak their request. The fulfillment device 22 may record the audio of the spoken request to obtain a digital representation of the spoken request, generate an audio request which includes the digital representation, and forward the audio request to the request processing system 30 for processing.

The general-purpose computing devices 24 may execute an application 26. The application 26 may configure the computing device 24 to communicate with the fulfillment devices 22, with the request processing system 30, or with both the fulfillment devices 22 and request processing system 30 via the network 90. In particular, the application 26 may configure the computing device 24 for generating and sending natural language requests to the request processing system 30. The application 26 may further provide on configuration interface, which enables a customer to configure its fulfillment devices 22. For example, the provided configuration interface may enable a customer to provide fulfillment device 22 with network configuration data so that the fulfillment device 22 may connect to the request processing system 30 via a wireless access point of the customers residence.

Each computing device 24 may be implemented as a smart phone, a tablet computing device, a laptop computing device, a desktop computing device, gaming console, wearable computing device, and/or some other computing device that is capable of executing the application 26. Moreover, the application 26 may include a native application specifically designed for the computing device 24 and may provide the computing device 24 with access to the fulfillment devices 22 and the request processing system 30 when executed. For example, if the computing device 24 is an iPhone™, iPad™, an Apple® Watch™ or some other iOS™ device, then the application 26 may be a native iOS™ application that has been downloaded and installed from the Apple® App Store. Similarly, if the computing device 24 is a Windows™ computing device, the application 26 may be a native Windows™ application.

In other embodiments, the application 26 may not be a native application specifically designed for the respective computing platform. Instead, the application 26 may be implemented as a Web application in which various Web and/or Internet technologies, such as Hyper-Text Markup Language (HTML) pages, Javascript, etc., configure a web browser of the computing device 24 to provide the computing device 24 with access to fulfillment devices 22 and the request processing system 30.

The request processing system 30 may receive natural language requests from the client computing devices 20, process the received requests to identify the intent of such natural language requests, and fulfill such natural language requests per the identified intent. To this end, the request processing system 30 may include a request management system 40, an inventory system 50, a member database system 60, an natural language processing (NLP) system 70, and a fulfillment system 80.

The request management system 40 may manage and direct delivery of the received requests to the appropriate services of the request processing system 30. The inventory system 50 may maintain data 55 about goods and services available for purchase. Such goods/services data 55 may include the quantity of each good available purchase. The goods/services data 55 may further include a description of each good and service as well as various attributes or variations for each good and service such as, for example, size, color, brand name, item SKU (stock keeping unit), price, associated promotional offers, available service times, etc.

The member database system 60 may maintain data about members who have registered with the request fulfillment system 10. In particular, the member database system 60 may store a member profile 67 for each registered member that includes various information about that particular member. For example, each member profile 67 may include contact information (e.g., name, mailing address, shipping address, phone number, email address), payment information (e.g., debit card number, credit card number, checking account number, etc.), and a purchase history that identifies the goods and services the respective member has purchased in the past. Each member profile 67 may further specify clothing sizes, color preferences, brand preferences, product quality/grade preferences, etc. of the respective member, which may aid in identifying goods and services that are the concepts of a received request.

Furthermore, the member database system 60 may further include bindings 69 to client computing devices 20 of the associated member. In particular, a customer or member may register one or more fulfillment devices 22 and computing devices 24 with their member profile 67. Such registration may tie or bind the client computing devices 20 that belong to the customer to their member profile 67 based on data that may uniquely identify the client computing device 20 or the customer. For example, the registration process may associate a client computing device 20 to a member profile 67 based on a device serial number, an Internet Protocol (IP) address, a Media Access Control (MAC) address, a customer identifier, customer credentials, a cryptographic key, a cryptographic hash value, other client device identifying data, other customer identifying data, or combination of such data. After registering such client computing devices 20 to a member profile 67 using such client device identifying data and customer identifying data, the request fulfillment system 10 may identify from which customer a request originated based upon data supplied by the client computing device 20.

The NLP system 70 may process the received natural language requests to identify an intent of each request as well as a confidence level for the identified intent. To this end, the NLP system 70 may utilize speech recognition algorithms to convert the spoken requests to natural language text and may further utilize natural language understanding algorithms to process the natural language texts in order to identify an intent of the request. As part of such processing, the NLP system 70 may further generate a confidence level or score for the identified intent, which provides an indication as to how certain the NLP system 70 is that the deduced intent of the request accurately portrays the actual intent of the request. In some embodiments, the NLP system 70 may utilize intent models and information in the members profile 67 to identify the intent and concepts of the received request and to determine the confidence level for the identified intent. The NLP system 70 may further provide the request management system 40 with the identified intent and concepts of the request as well as and its determined confidence level.

In one embodiment, the NLP system 70 utilizes natural language understanding algorithms and services provided by a Nuance Mix engine. The Nuance Mix engine provides speech-to-text (STT), text-to-speech (TTS), and natural language understanding services. In particular, the natural language understanding services provide tools which enable developers to define a natural language model 75 comprising intents 76, samples 77 for expressing such intents, concepts 78 associated with the intents 76, and tags 79 for tagging concepts in samples 77.

Each intent 76 represents an action supported by the request processing system 30. For example, an intent 76 may be defined for purchasing goods. Another intent 76 may be defined for inquiring about the weather. Yet another intent 76 may be defined for inquiring about the status of previously order goods.

Each intent 76 may further include several samples 77 that provide examples for expressing the related intent 76. For example, an intent 76 for purchasing goods may include the following samples:

Hi Alfie. I would like to order 2 pounds of fresh tomatoes.
Please send milk.
I would like to order a white dress shirt and dark dress pants for my husband.

Similarly, an intent 76 for inquiring about the weather may include the following samples:

What's the weather?
What's tomorrow's forecast?
Will it rain tomorrow?
What is next weeks weather forecast for New York?

In addition to defining samples 77 for the intents 76, the natural language understanding model 75 includes concepts 78 that generally define details relevant to the various intents. For example, a purchasing goods intent 76 may have a concept 78 of an available good. The natural language understanding model 75 may include literal-value pairs, which associate several literals to a single relevant value for the concept. For example, a goods concept 78 may associate the literals "pants" and "slacks" with the value of PANTS. To ease the creation of relevant concepts 78 for the intents 76, the natural language understanding services further provide tags 79, which enable a developer to tag or mark-up samples 77 in order to identify the relevant concepts in the sample 77. For example, there may be a color concept 78. A tag 79 may be added to a sample 77 to identify the color concept present in the sample. For example, in the sample 77, "Please send me a [color] white[/] shirt," the term "white" has been tagged to identify it as a color concept of the sample 77.

While intents 76, samples 77, concepts 78, and tags 79 of the natural language understanding model 75 may be explicitly specified, the natural language service is capable of learning or recognizing patterns in the provided samples 77. As such, the natural language understanding service over time may automatically recognize new values for a concept 78 or may automatically recognize that two values for a concept 78 are interchangeable.

Based on the identified intent, the identified concepts, and their respective confidence levels, the request management system 40 may forward the processed request to an appropriate service of the fulfillment system 80. For example, the request management system 40 may forward the audio request to a computing device 82 of the fulfillment system 80 for further processing by an employee when the confidence level is below a threshold level. An employee associated with the computing device 82 may review the natural language request, intent determined by the NLP system 70, and information from the relevant customer profile 67 to determine whether the request may be reliably fulfilled or whether a dialog with the customer should be established in order to further clarify the request.

Assuming at least a threshold level of certainty is obtained with respect to the received request, the request management system 40 may forward the request to an appropriate service of the fulfillment system 80 so that the fulfillment system 80 may fulfill the request received from the customer. For example, the request management system 80 may determine that the request is for purchasing of one or more identified goods. The request management system 40 may send the request to a goods fulfillment service the fulfillment system 80. The goods fulfillment service may cause the identified goods to be gathered, may cause the gathered goods to be shipped to the customer, and may bill the customer accordingly for the shipped goods.

FIG. 1 depicts an example embodiment of a request fulfillment system 10. However, the fulfillment system 10 may be implemented in numerous different manners using a wide range of different computing devices, platforms, networks, etc. In particular, various computing systems and services may be distributed differently than as depicted in FIG. 1. For example, FIG. 1 depicts the request management system 40, the inventory system 50, the member database system 60, the NLP system 70, and the fulfillment system 80 as separate computing systems. However, in some embodiments, each of these systems may include one or more web servers, database servers, email servers, short message service (SMS) servers, routers, load balancers, and/or other computing and/or networking devices that cooperate to perform the above-noted functions. In other embodiments, one or more of these systems or services may be implemented by a single computing device or system instead of being distributed among several computing devices or systems.

Figure 2:
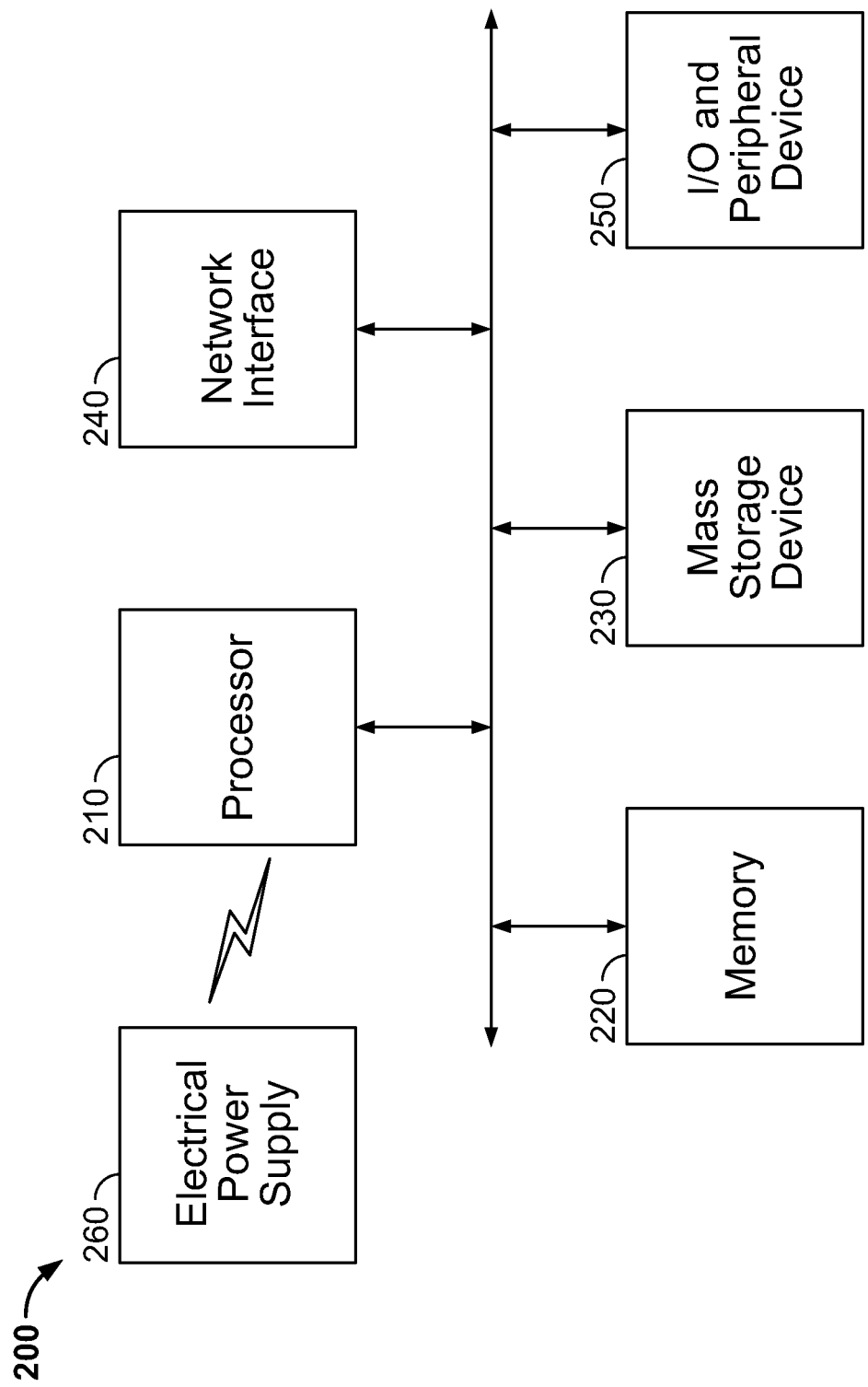
FIG. 2 shows a simplified depiction of an example computing device suitable for implementing one or more of the computing systems of the request processing system of FIG. 1.

In some embodiments, the fulfillment devices 22, customer computing devices 24, the request management system 40, the inventory system 50, the member database system 60, the NLP system 70, the fulfillment system 80, and employee computing devices may be implemented using one or more computing devices and/or embedded computing devices. FIG. 2 provides a simplified depiction of a computing device 200 suitable for such aspects of the request fulfillment system 10. As shown, the computing device 200 may include a processor 210, a memory 220, a mass storage device 230, a network interface 240, various input/output (I/O) and peripheral devices 250, and an electrical supply system 260. The processor 210 may be configured to execute instructions, manipulate data and generally control operation of other components of the computing device 200 as a result of its execution. To this end, the processor 210 may include a general purpose processor such as an x86 processor or an ARM processor, which are available from various vendors. However, the processor 210 may also be implemented using an application specific processor, microcontroller, and/or other circuitry.

The memory 220 may include various types of random access memory (RAM) devices, read only memory (ROM) devices, flash memory devices, and/or other types of volatile or non-volatile memory devices. In particular, such memory devices of the memory 220 may store instructions and/or data to be executed and/or otherwise accessed by the processor 210. In some embodiments, the memory 220 may be completely and/or partially integrated with the processor 210.

In general, the mass storage device 230 may store software and/or firmware instructions which may be loaded in memory 220 and executed by processor 210. The mass storage device 230 may further store various types of data which the processor 210 may access, modify, and/otherwise manipulate in response to executing instructions from memory 220. To this end, the mass storage device 230 may comprise one or more redundant array of independent disks (RAID) devices, traditional hard disk drives (HDD), sold state device (SSD) drives, flash memory devices, read only memory (ROM) devices, and/or other types of non-volatile storage devices.

The network interface 240 may enable the computing device 200 to communicate with other computing devices via network 90. To this end, the networking interface 240 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, etc.) or near field communication (NFC) interface, and/or some other type of networking interface capable of providing a communications link between the computing device 200 and network 90 and/or another computing device.

Finally, the I/O and peripheral devices 250 may generally provide devices which enable a user to interact with the computing device 200 by either receiving information from the computing device 200 and/or providing information to the computing device 200. For example, the I/O and peripheral devices 250 may include display screens, keyboards, mice, touch screens, microphones, audio speakers, audio codecs, digital cameras, optical scanners, RF transceivers, etc.

The electrical supply system 260 may generally supply and distribute electrical power to the various components of the computing device 200. To this end, the electrical supply system 260 may include alternating current (AC) power supplies, power regulators, power conditioners, power rectifiers, batteries, battery chargers, power cables, power input ports, etc. In some embodiments, the computing device 200 is AC powered. In such an embodiment, the electrical supply system 260 may include an AC power supply that receives AC power from an AC outlet via a power cable. The AC power supply may convert and condition the received AC power to appropriate direct current (DC) levels for the various components of the computing device 200.

In other embodiments, the computing device 200 is battery powered. In such an embodiments, the electrical supply system 260 may include one or more rechargeable batteries that are conditioned to supply appropriate DC levels to the various components of the computing device 200. In such embodiments, the electrical supply system 260 may further include a battery charger that is configured to charge the batteries.

While the above provides some general aspects of a computing device 200, there may be significant variation in actual implementations of a computing device. For example, a smart phone implementation of a computing device generally uses different components and may have a different architecture than a database server implementation of a computing device. However, despite such differences, computing devices generally include processors that execute software and/or firmware instructions in order to implement various functionality. As such, the above described aspects of the computing device 200 are not presented from a limiting standpoint but from a generally illustrative standpoint. Aspects of the present application may find utility across a vast array of different computing devices and the intention is not to limit the scope of the present application to a specific computing device and/or computing platform beyond any such limits that may be found in the appended claims.

Figure 3:
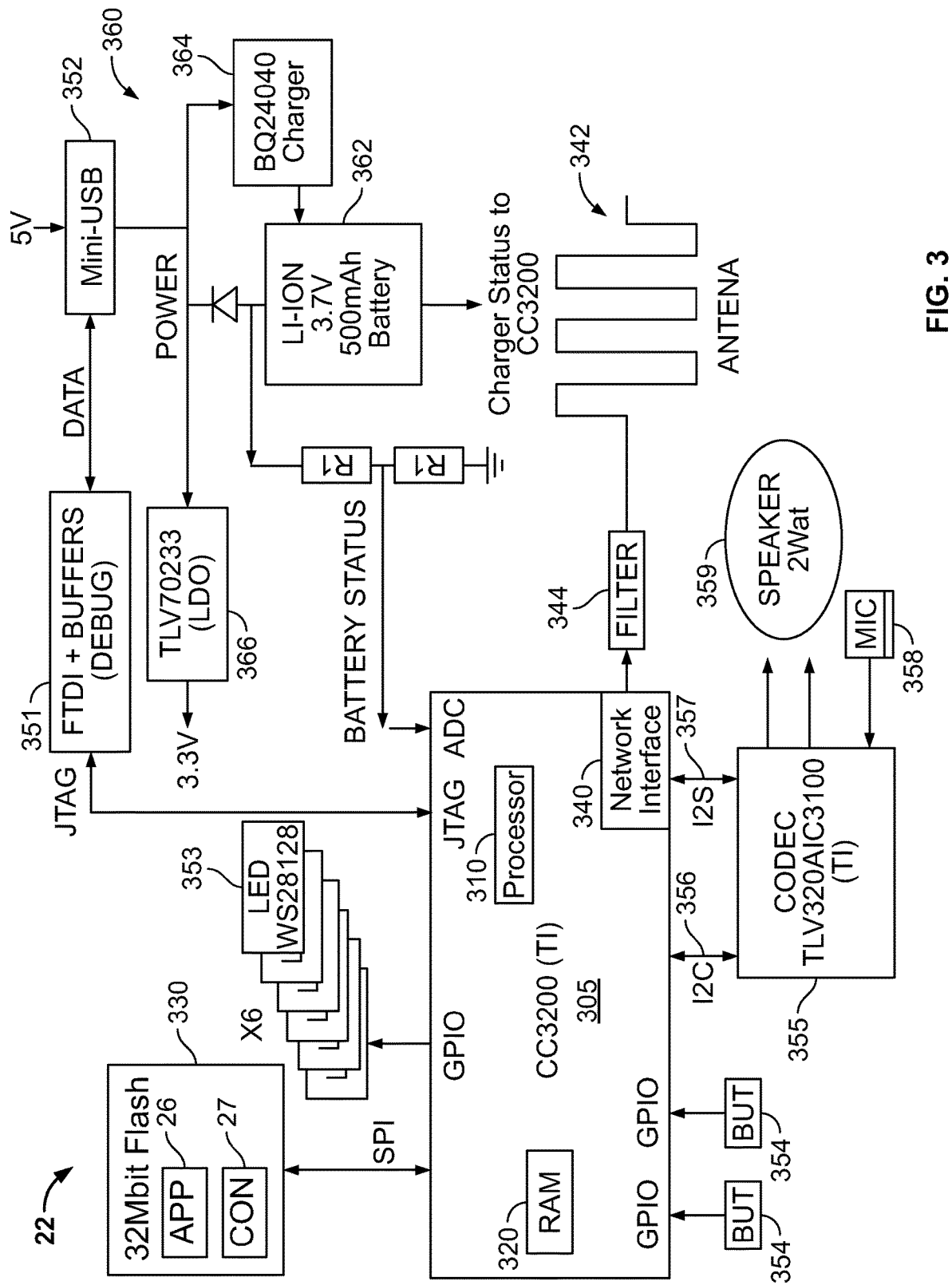
FIG. 3 shows an embodiment of the fulfillment device of request processing system of FIG. 1

For example, further details with respect to an embodiment of a fulfillment device 22 are presented in FIG. 3. As shown in FIG. 3, the fulfillment device 22 may include a microcontrol unit (MCU) 305. As shown, the MCU 305 may be implemented with a Texas Instrument CC3200 MCU, which includes an ARM processing core 310, embedded random access memory (RAM) 320, and a built-in network interface 340. The network interface 340 may provide the fulfillment device 22 with wireless networking capabilities. To this end, the network interface 340 may be coupled to an antenna 342 via one or more filters 344.

More specifically, the network interface 340 may include a IEEE 802.11 b/g/n radio and read-only memory (ROM) to store WiFi and Internet protocols. The network interface 340 further includes a medium access control (MAC) interface, a Wi-Fi driver, and a TCP/IP stack. The TCP/IP stack may support eight simultaneous TCP (Transport Control Protocol) or UDP (User Datagram Protocol) sockets, and two simultaneous TLS (Transport Layer Security) and SSL (Secure Socket Layer) sockets. Moreover, the network interface 340 may support WPA2 (WiFi Protected Access 2) Personal and Enterprise security modes.

The fulfillment device 22 may further include flash memory 330 that is coupled to the MCU 305 via a serial peripheral interface (SPI) bus 332. The flash memory 330 may store the application 26 and configuration data 27 of the fulfillment device 22 in a nonvolatile manner. In the depicted embodiment, the flash memory 320 provides 32 megabits of storage space.

The fulfillment device 22 may further include an electrical power system 360. The electrical power system 360 may include a lithium ion battery 362, a battery charger 364, and a regulator 366. As shown, the battery charger 364 may charge the battery 362 using power drawn from a mini-USB (Universal Serial Bus) port 352. In particular, the mini-USB port 352 may supply the charger 365 with 5 volts which in turn charges the 3.7 volt 500 mAh battery 362. In some embodiments, the battery charger 364 may be implemented with a Texas Instrument (TI) BQ24040. The TI BQ24040 is a 1 amp, single-input, single cell lithium-ion battery charger integrated circuit which is suitable for portable devices. The regulator 366 may condition the received 3.7 volts of the battery 362 and supply the MCU 305, memory 330, and other components with 3.3 volts. In some embodiments, the regulator 366 may be implemented with a TI TLV70233, which is a 300 milliamp, low-dropout linear regulator.

As shown, the fulfillment device 22 may include several I/O devices. In particular, the fulfillment device 22 may include several status light-emitting diodes (LED) 353 that are coupled to one or more general-purpose input-output (GPIO) ports of the MCU 305. The MCU 305 may control the status LEDs 353 in order to reflect appropriate status of the fulfillment device 22. For example, the MCU 305 via the LEDs 353 may indicate whether the fulfillment device 22 is powered-on, whether the fulfillment device 22 has network connectivity to the request processing system 30, or whether the fulfillment device 22 has encountered an error condition.

The fulfillment device 22 may include one or more buttons 354 that are coupled to the GPIO ports of the MCU 305. Via the GPIO ports, the buttons 354 may signal or request that the MCU 305 to take various actions. For example, a customer may press one of the buttons 354 to initiate a natural language request and cause the MCU 305 to begin recording the customer's spoken request.

To this end, the fulfillment device 22 may further include an audio codec 355 which is coupled to the MCU 305 via an Inter-Integrated Circuit ($I^2C$) bus 356 and an Inter-IC Sound ($I^2S$) bus 357. The audio codec 355 may include an analog-to-digital converter (ADC) that is configured to digitize audio signals received via a microphone 358 and provide the digitized audio signals to the MCU 305. The audio codec 355 may further include a digital-to-audio converter (DAC) that is configured to drive a speaker 359 based on digitized audio signals received from the MCU 305. In some embodiments, the audio codec may be implemented with a TI TLV320AIC3100, which is a low-power audio codec with audio processing and a mono amplifier.

Finally, as shown, MCU 305 may further provide a Joint Test Action Group (JTAG) interface. The JTAG interface may enable debugging the fulfillment device 22 via the mini-USB port 352 and JTAG debug buffers 351.

Figure 4:
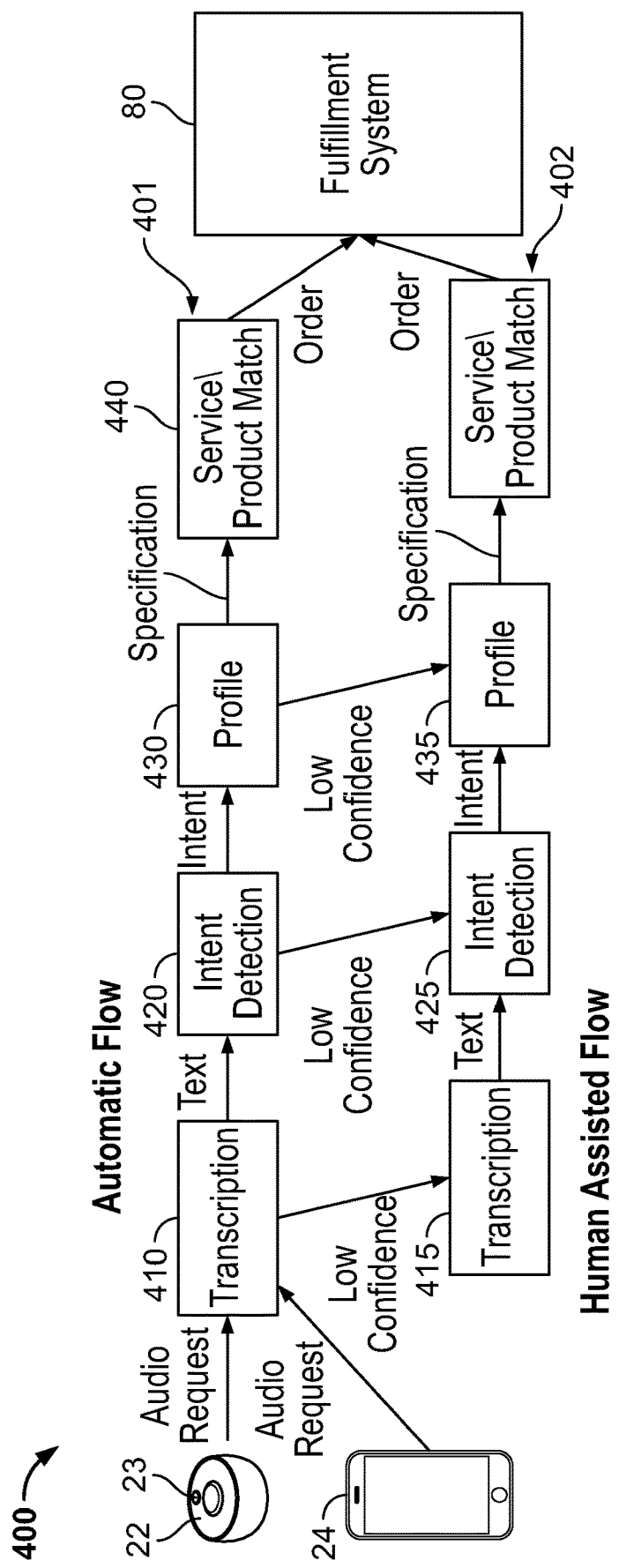
FIG. 4 shows a flow diagram for a request processing method implemented by the request processing system of FIG. 1.

Referring now to FIG. 4, a method 400 of processing an audio request is shown. As shown, the method 400 includes an automatic flow 401 and a human-assisted flow 402. The automatic flow 401 generally corresponds to automated, computerized processing of the request. The human-assisted flow 402 generally corresponds to human-assisted processing of the request in which an employee reviews and processes one or more aspects of the request. In general, the method 400 directs requests to employees for further processing when the automatic flow 401 determines that the automatic processing of the request generated results having a confidence level below a threshold level.

As shown the method 400 may be initiated in response to a request received from a client computing device 20, such as the fulfillment device 22 or the computing device 24. As noted above, a customer may press a button 23 on the fulfillment device 22 to cause the fulfillment device 22 to record a spoken request of the customer. In particular, the fulfillment device 22 may record the audio of the spoken request to obtain a digital representation of the spoken request, generate an audio request which includes the digital representation, and forward the audio request to the request processing system 30 for processing. In one embodiment, the fulfillment device 22 may send the audio request to the request processing system 30 via a Hypertext Transfer Protocol (HTTP) request. In particular, the fulfillment device may uses an HTTP POST or PUT request to supply the request processing system 30 with a digital representation of the spoken request as well as data that identifies the customer, the fulfillment device 22, or both. The computing device 24 via its application 26 may capture and send an audio request to the request processing system 30 in a similar manner.

The request management system 40 of the request processing system 30 may receive the incoming audio request. The request management system 40 at 410 may convert or transcribe the spoken request to text. In particular, the request management system 40 may utilize natural language processing services of the NLP system 70 to analyze the digital representation of the spoken request and generate a transcription of the spoken request. Besides generating a transcription of the spoken request, the NLP system 70 may further provide a confidence level or score for the accuracy of the provided transcription.

If confidence level in the provided transcription does not satisfy a threshold level of confidence for transcriptions, then the request management system 40 may forward the audio request and the generated transcription to an employee for further processing. In particular, the request management system 40 may forward the audio request and transcription to a computing device 82 of the fulfillment system 80. At 415, the employee may playback the digital representation of the spoken request and correct the generated transcription appropriately. Beyond merely correcting the transcription, the employee may further augment the transcription via the computing device 82 to further clarify the spoken request. Such augmentation may include adding words, removing words, replacing words, or otherwise altering the text of the transcription to clarify the spoken request.

If the confidence level satisfies the transcription threshold level of confidence, then the request management system 40 at 420 may deduce the intent of the spoken request from the transcription of the spoken request. In particular, the request management system 40 may utilize natural language understanding services of the NLP system 70 to analyze the transcription of the spoken request and identify or deduce an intent of the spoken request. Besides identifying the intent of the spoken request, the NLP system 70 may further provide a confidence level or score for the accuracy of the identified intent.

If confidence level in the identified intent does not satisfy a threshold level of confidence for intent identification, then the request management system 40 may forward the transcription and the identified intent to an employee for further processing. In particular, the request management system 40 may forward the audio request, the transcription of the audio request, and the identified intent to a computing device 82 of the fulfillment system 80. At 425, the employee may review the transcription and identify an intent of the spoken request based on the transcription. The employee may furthermore playback the digital representation of the spoken request if the employee believes there may be errors or clarity issues with the transcription.

If the confidence level satisfies the intent identification threshold level of confidence, then the request management system 40 at 430 may analyze the customer's profile 67 and generate a specification that specifies the intent of the spoken request based on the profile 67. In particular, the request management system 40 may utilize natural language understanding services of the NLP system 70 to analyze the intent in light of the customer's profile 67 to generate a definite specification of how to fulfill the spoken request. For example, the customer's profile 67 may include color preferences, clothing sizes, brand preferences, and a purchase history of previously purchased goods. Such information may be used to further specify the request. For example, based on such information, the NLP system 70 may determine the appropriate size for a requested clothing item. Similarly, if the profile 67 indicates the customer always purchases two gallons of 2% milk, then system 70 may be confident that a simple request of "Send milk" is intended to result in the purchase of two gallons of 2% milk. Besides generating the fulfillment specification, the NLP system 70 may further provide a confidence level or score for the accuracy of the generated fulfillment specification.

If confidence level in the fulfillment specification does not satisfy a threshold level of confidence for specification generation, then the request management system 40 may forward the request to an employee for further processing. In particular, the request management system 40 may forward the request, the generated transcription, the identified intent, the customer profile 67, and the generated fulfillment specification to a computing device 82 of the fulfillment system 80. At 435, the employee may review the transcription, the identified intent, the customer profile 67, and the generated specification. The employee may also playback the digital representation of the spoken request if the employee believes there may be error or clarity issues with the transcription. Based on such review, the employee may alter or augment the generated specification such that the specification specifies in a definite manner how the request is to be fulfilled.

At 440, the request management system 40, based on the fulfillment specification, may match the request with the appropriate fulfillment service of the fulfillment system 80, generate an order appropriate for the identified fulfillment service, and forward the generated order to the identified fulfillment service. For example, the specification may identify goods to be purchased and the customer that wishes to purchase the identified goods. The request management system 40 at 440 may generate a purchase order for the customer that identifies the goods to be purchased and direct the purchase order to a purchase order fulfillment service, which directs employees to gather, ship, and bill the goods identified by the purchase order.

At 445, an employee via a computing device 82 of the fulfillment system 80 may match the request with the appropriate fulfillment service of the fulfillment system 80. The employee, based on the fulfillment specification, may generate an order appropriate for the identified fulfillment service, and forward the generated order to the identified fulfillment service. For example, the specification may identify goods to be purchased and the customer that wishes to purchase the identified goods. The employee via computing device 82 may generate a purchase order for the customer that identifies the goods to be purchased and direct the purchase order to a purchase order fulfillment service, which directs employees to gather, ship, and bill the goods identified by the purchase order.

Figure 5:
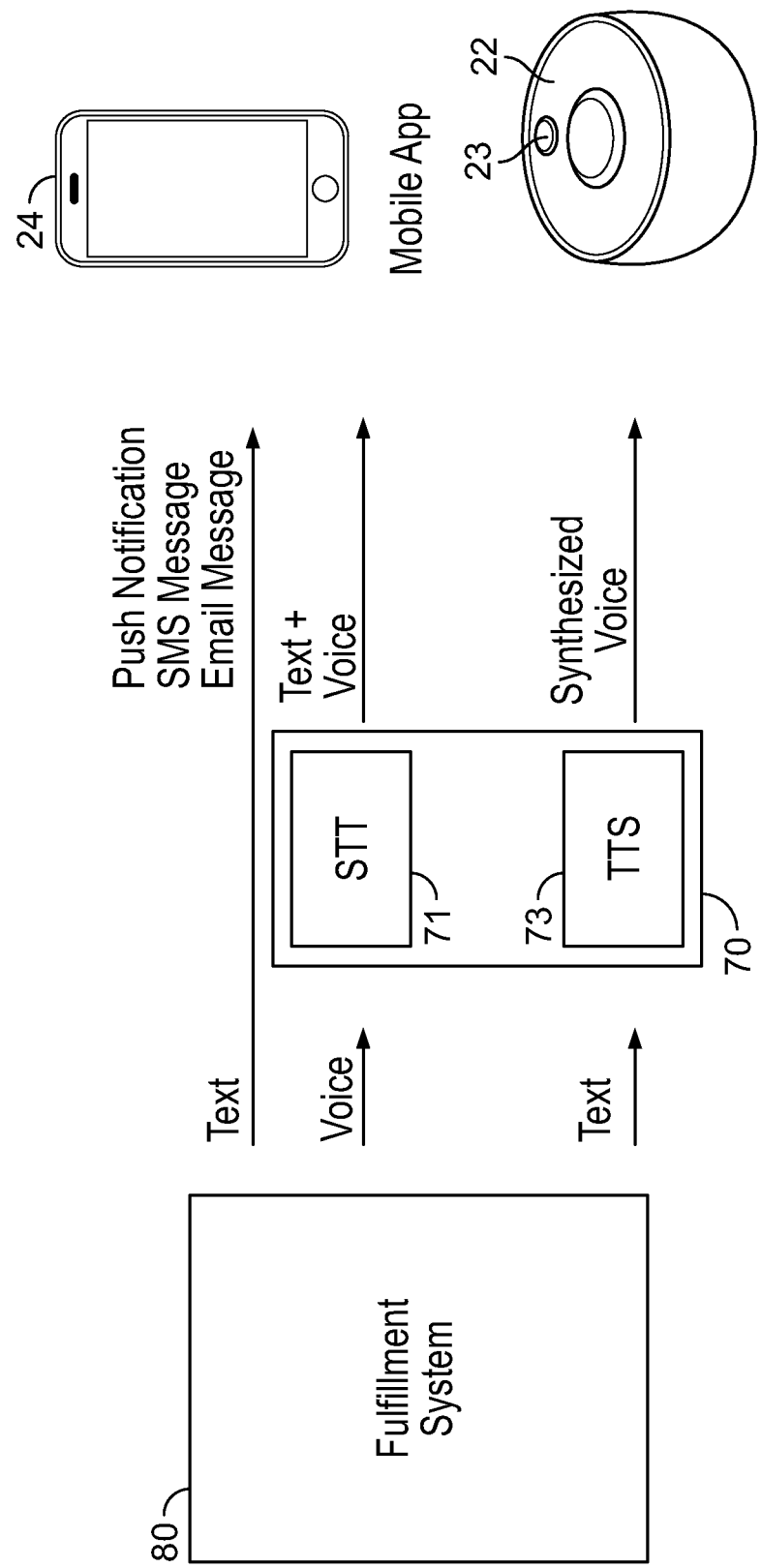
FIG. 5 shows a flow diagram depicting responses sent by a fulfillment system of the request processing system of FIG. 1.

The fulfillment system 80 receives the order from either the automatic flow 401 or the human-assisted flow 402. The appropriate fulfillment service for the received order may process the order and provide the client computing device 20 with an appropriate response. As shown in FIG. 5, the fulfillment system 80 may respond to a computing device 20 via a text or voice messages. In particular, the fulfillment system 80 may send text messages to the client computing device 20 as an email message, an SMS message, a push notification, an instant message, or some other textual based message. For such embodiments, the fulfillment system 80 may generate or compose the text of the sent message such that the sent textual message provides an appropriate answer or response to the received request. For example, if request was for the purchase of goods, the fulfillment system 80 may respond with a sales receipt which identifies the purchased goods, the cost of each good, a method of payment, and a grand total charged to the identified method of payment. As another example, if the request was for the current weather conditions, the fulfillment system 80 may respond with a message that provides the current weather conditions for the current location of the fulfillment device 22.

In some embodiments, the fulfillment system 80 may provide a suitable voice message for responding to the request. For example, an employee via a computing device 82 may record a suitable voice response to the received request. As further shown in FIG. 5, the fulfillment system 80 may utilize a speech-to-text (STT) service 71 of the NLP system 70 to convert a voice message to a textual message, which may be sent to the computing device 24 in lieu of or in addition to the voice message. The fulfillment system 80 may further utilize a text-to-speech (TTS) service 73 of the NLP system 70 to convert a textual message to a synthesized voice message suitable for playback by the fulfillment device 22.

Referring back to FIG. 4, the employee at 415, 425, 435, 445 may analyze various aspects of the received request in order to ascertain the intent of the spoken request and fulfill the request appropriately. At any of these stages, the employee may still be uncertain with respect to how the spoken request should be fulfilled. In such cases, the employee may engage in a dialog with the customer. Such a dialog may be conducted via a number of different manners. For example, the dialog may occur via telephone, email, SMS messages, instant messages, or a voice-over Internet Protocol (VOIP) exchange conducted between the computing device 82 and the fulfillment device 22 or computing device 24.

Furthermore, FIG. 4 depicts process flows from the automatic flow 401 to the human-assisted flow 402, but does not depict process flows from the human-assisted flow 402 back to the automatic flow 401. In some embodiments, once an employee begins to provide assistance with respect to processing a request, the employee simply finishes the processing of the request to ensure proper handling of the request. However, in other embodiments, the request processing method 400 may permit the employee to reinsert the request into the next stage of the automatic flow 401 after altering or otherwise augmenting the request. For example, the employee may augment the transcription at 415 and reinsert the request with the augmented transcription back into the automatic flow 401 at 420 for further processing.

Figure 6:
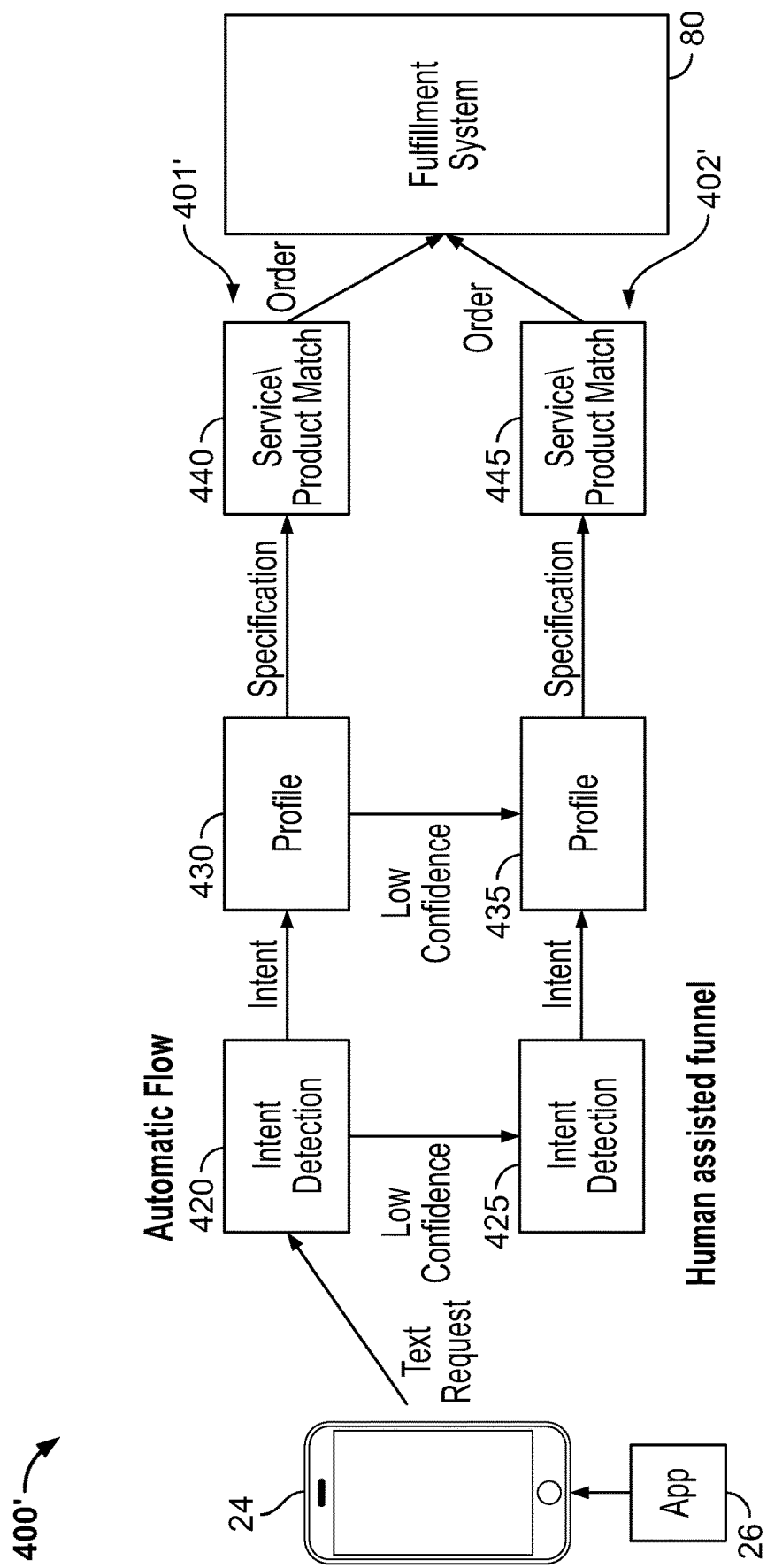
FIG. 6 shows another flow diagram for another request processing method implemented by the request processing system of FIG. 1.

Referring now to FIG. 6, another method 400' for processing a textual request is shown. The method 400' is similar to the method 400 of FIG. 4. However, the incoming request in FIG. 5 is a textual request instead of an audio request. For example, via the computing device 24 and application 26, a customer may type a textual request and send the textual request to the request processing system 30 for processing. Such a request may be sent via an HTTP POST or PUT request in a manner similar to FIG. 4. However, in some embodiments, the textual request may also be sent via other textual based communications protocols such as via a email message, SMS message, and instant message.

Since the received request is already textual, the NLP system 70 need not transcribe the received message. As such, the method 400' begins at 420 with the NLP system 70 identifying the intent of the received textual request.

Various embodiments have been described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a tangible, computer readable storage medium such as, for example, flash memory devices, hard disk devices, compact disc media, DVD media, EEPROMs, etc. Such instructions, when executed by one or more computing devices, may result in the one or more computing devices performing various aspects of the processes depicted in FIGS. 4, 5, and 6.

While the present disclosure has described certain embodiments, it will be understood by those skilled in the art that various changes may be made and equivalents may be substituted without departing from the intended scope of protection. In addition, many modifications may be made to adapt a particular situation or material to the teachings of the present disclosure without departing from its scope. Therefore, it is intended that the present disclosure not be limited to the particular embodiment or embodiments disclosed, but encompass all embodiments falling within the scope of the appended claims.

What is claimed is:

1. A method, comprising:
receiving, with a request processing system from a client computing device, a natural language request of a customer and device identifying data that uniquely identifies the client computing device, wherein the natural language request of the customer comprises a digitized spoken request of the customer;
identifying, with the request processing system, based on the device identifying data received from the client computing device, a member profile for the customer that is bound to the client computing device;
generating, with the request processing system, a transcription of the digitized spoken request that includes text representative of the digitized spoken request;
determining, with the request processing system based on the text representative of the digitized spoken request, that an intent of the natural language request is to purchase one or more goods;
determining, with the request processing system based on the text representative of the digitized spoken request, a confidence level of the determined intent;
in response to the confidence level of the determined intent not satisfying a threshold level,
sending the natural language request to a fulfillment computing device of the request processing system;
presenting, via the fulfillment computing device, the natural language request to a person associated with the fulfillment computing device;
augmenting the natural language request based on input received from the person via the fulfillment computing device to obtain an augmented request; and
generating a purchase order for the one or more goods of the natural language request per the augmented request and the member profile for the customer; and
in response to the confidence level of the determined intent satisfying the threshold level, generating the purchase order for the one or more goods of the natural language request per the determined intent and the member profile for the customer; and
sending the purchase order to a fulfillment system that completes the purchase of the one or more goods.

2. The method of claim 1, further comprising:
generating a response indicative of fulfillment per the determined intent; and
sending the response to the customer via the client computing device.

3. The method of claim 1, wherein generating the purchase order per the member profile for the customer comprises selecting the one or more goods based on preferences of the customer that are stored in the member profile for the customer.

4. The method of claim 1, wherein generating the purchase order per the member profile for the customer comprises selecting the one or more goods based on goods that the member profile for the customer indicates were previously purchased by the customer.

5. The method of claim 1, further comprising:
sending the digitized spoken request to the fulfillment computing device in response to a transcription confidence level for the generated transcription not satisfying a transcription threshold level;
presenting, via the fulfillment computing device, the text of the generated transcription to the person associated with the fulfillment computing device; and
augmenting the text of the generated transcription based on input received from the person via the fulfillment computing device.

6. The method of claim 5, wherein said augmenting the text of the generated transcription includes adding words, removing words, replacing words, or otherwise altering the text of the generated transcription to clarify the digitized spoken request.

7. The method of claim 1, wherein generating the purchase order per the member profile for the customer comprises selecting the one or more goods based on size information stored in a profile for the customer.

8. A system, comprising:
a plurality of fulfillment devices; and
one or more computing systems configured to:
receive, from a fulfillment device of the plurality of fulfillment devices, a natural language request of a customer and device identifying data that uniquely identifies the fulfillment device, wherein the natural language request of the customer comprises a digitized spoken request of the customer;
identify, based on the device identifying data received from the fulfillment device, a member profile for the customer that is bound to the fulfillment device;
generate a transcription of the digitized spoken request that includes text representative of the digitized spoken request;
determine, based on the text, that an intent of the natural language request is to purchase one or more goods and a confidence level of the determined intent;
in response to the confidence level of the determined intent not satisfying a threshold level,
receive an augmented request; and
generate a purchase order for the one or more goods of the natural language request per the augmented request and the member profile for the customer;
in response to the confidence level of the determined intent satisfying the threshold level, generate the purchase order for the one or more goods of the natural language request per the determined intent and the member profile for the customer; and
complete the purchase of the one or more goods of the purchase order; and
a computing device is configured to, in response to the confidence level of the determined intent not satisfying the threshold level:
receive the natural language request from the one or more computing systems;
present the natural language request to a person associated with the fulfillment computing device;
augment the natural language request based on input received from the person to obtain the augmented request; and
send the augmented request to the one or more computing systems.

9. The system of claim 8, wherein the one or more computing systems are further configured to:
generate a response indicative of fulfillment per the determined intent; and
send the response to the customer via the fulfillment device.

10. The system of claim 8, wherein the one or more computing systems are further configured to generate the purchase order per the member profile for the customer by selecting the one or more goods based on preferences of the customer that are stored in the member profile for the customer.

11. The system of claim 8, wherein the one or more computing systems are further configured to generate the purchase order per the member profile for the customer by selecting the one or more goods based on goods that the member profile for the customer indicates were previously purchased by the customer.

12. The system of claim 8, wherein:
the one or more computing systems are further configured to send the digitized spoken request to the fulfillment computing device in response to a transcription confidence level for the generated transcription not satisfying a transcription threshold level; and
the computing device is further configured to:
present the text of the generated transcription to the person associated with the computing device; and
augment the text of the generated transcription based on input received from the person associated with the computing device.

13. The system of claim 12, wherein the computing device is further configured to augment the text of the generated transcription by adding words, removing words, replacing words, or otherwise altering the text of the generated transcription to clarify the digitized spoken request.

14. The system of claim 8, wherein the one or more computing systems are further configured to generate the purchase order per the member profiled for the customer by selecting the one or more goods based on brand preference information stored in the member profile for the customer.

15. A system for use with one or more fulfillment devices, the system comprising:
a database system storing member profiles for customers;
a computing system configured to:
receive, from a fulfillment device, a natural language request of a customer, wherein the natural language request of the customer comprises a digitized spoken request of the customer;
obtain a member profile for the customer from the database system;
generate a transcription of the digitized spoken request that includes text representative of the digitized spoken request;
determine, based on the text, that an intent of the natural language request is to purchase one or more goods;
determine, based on the text, a confidence level of the determined intent;
in response to the confidence level of the determined intent not satisfying a threshold level,
receive an augmented request; and
generate a purchase order for the one or more goods of the natural language request per the augmented request and the member profile for the customer;
in response to the confidence level of the determined intent satisfying the threshold level, generate the purchase order for the one or more goods of the natural language request per the determined intent and the member profile for the customer; and
complete the purchase of the one or more goods of the purchase order; and
a computing device configured to, in response to the confidence level of the determined intent not satisfying the threshold level:
receive the natural language request from the computing system;
present the natural language request to a person associated with the computing device;
augment the natural language request based on input received from the person to obtain the augmented request; and
send the augmented request to the computing system.

16. The system of claim 15, wherein the computing system is further configured to:
generate a response indicative of fulfillment per the determined intent; and
send the response to the customer via the fulfillment device.

17. The system of claim 15, wherein the computing system is further configured to generate the purchase order per the member profile for the customer by selecting the one or more goods based on preferences of the customer that are stored in the member profile for the customer.

18. The system of claim 15, wherein the computing system is further configured to generate the purchase order per the member profile for the customer by selecting the one or more goods based on goods that the member profile for the customer indicates were previously purchased by the customer.

* * * * *